United States Patent
Xu et al.

[11] Patent Number: 6,107,224
[45] Date of Patent: *Aug. 22, 2000

[54] GLASS COMPOSITIONS FOR HIGH THERMAL INSULATION EFFICIENCY GLASS FIBERS

[75] Inventors: Xiaojie Xu, Littleton; Foster Laverne Harding, Douglas County; Mark Alan Albers, Littleton, all of Colo.

[73] Assignee: Johns Manville International, Inc., Denver, Colo.

[ * ] Notice: This patent is subject to a terminal disclaimer.

[21] Appl. No.: 09/195,673

[22] Filed: Nov. 19, 1998

Related U.S. Application Data

[63] Continuation-in-part of application No. 08/877,259, Jun. 17, 1997, Pat. No. 5,932,499.

[51] Int. Cl.⁷ .......................... C03C 13/00; C03C 3/089; C03C 3/097
[52] U.S. Cl. .................. 501/35; 501/36; 501/59; 501/66; 501/70; 501/72; 252/62; 65/469; 65/435; 65/455
[58] Field of Search .................. 501/36, 35, 59, 501/66, 70, 72; 252/62; 65/455, 469

[56] References Cited

U.S. PATENT DOCUMENTS

| | | | |
|---|---|---|---|
| 5,108,957 | 4/1992 | Cohen et al. | 501/35 |
| 5,523,264 | 6/1996 | Mattson | 501/35 |
| 5,523,265 | 6/1996 | Rapp et al. | 501/35 |
| 5,932,499 | 8/1999 | Xu et al. | 501/35 |

FOREIGN PATENT DOCUMENTS

| | | |
|---|---|---|
| 954836 | 4/1964 | United Kingdom . |
| 95/32925 | 12/1995 | WIPO . |

OTHER PUBLICATIONS

English abstract of EP 0 738 692 Oct. 1996.
English abstract of WO/97 39990 Oct. 1997.

*Primary Examiner*—C. Melissa Koslow
*Attorney, Agent, or Firm*—E. Joseph Gess

[57] ABSTRACT

Glass compositions displaying decreased far infrared radiation transmission, high biosolubility, and excellent moisture resistance are capable of fiberization by the rotary process, and may be used to prepare thermal insulation products exhibiting high thermal insulation efficiency as reflected by low thermal index values. The insulation products also exhibit excellent stiffness and recovery properties.

27 Claims, 2 Drawing Sheets

GLASS COMPOSITIONS FOR HIGH THERMAL INSULATION EFFICIENCY GLASS FIBERS

RELATED APPLICATIONS

This application is a continuation-in-part of U.S. Ser. No. 08/877,259, filed Jun. 17, 1997 now U.S. Pat. No. 5,932,499.

TECHNOLOGICAL FIELD

The present invention pertains to glass compositions suitable for use in rotary fiberization to form thermal insulation products. More particularly, the subject invention pertains to glass compositions having lower radiation heat transfer, to a process for forming glass fibers suitable for fiberglass insulation products therefrom which exhibit excellent recovery characteristics, and the fiberglass insulation products so formed.

DESCRIPTION OF THE RELATED ART

An enormous tonnage of fiberglass insulation products are used in the building industry annually. Such insulation has been available for decades, and is available in several nominal thicknesses depending upon the degree of insulation desired. Many improvements in the quality of thermal insulation have been made over the past years, many of these centered on commercially desirable properties such as recovery from compression. Being a low density product, fiberglass insulation would be exorbitantly expensive to ship were it not for the ability to compress the fiberglass insulation in the form of bats or rolls, and allow the fiberglass to recover its initial thickness at the job site. Numerous changes in the types of glass involved, methods of forming the glass fibers into rolls and bats, and changes in the binder systems employed in such products, have resulted in high rates of recovery from compression. However, with respect to thermal insulating efficiency, such factors as product density, fiber distribution, fiber diameter, and the like have been reasonably well developed for some time, and thus little significant improvement in the thermal insulation efficiency of these products have been made over the past years.

There are four mechanisms of heat transfer through a fiberglass insulation product: radiation, conduction of air, conduction of glass, and air convection. The conductivity of air in all fibrous insulation can be viewed as a constant; the contribution of heat conduction by the fibers themselves is minimal in most low density insulation media; and the elimination of air convection is a basic prerequisite for any reasonable insulation. Radiation heat transfer, which represents approximately 40% of the total heat lost through a typical low density fiberglass building insulation product, is thus the only mechanism which offers a means by which thermal insulation efficiency may be significantly improved.

The factors influencing the radiation heat loss of a typical low-density fiberglass insulation are the density of the product, the quality of the fiberglass insulation product, and the chemical composition of the glass. Increasing product density can significantly reduce radiation heat loss. However, density increases extol a considerable penalty, not only in higher production costs and lower production rates, but also in shipping costs. The qualities of the product which affect thermal insulation efficiency are mainly those of fiber diameter, fiber orientation, and fiber distribution. Products made with uniformly thin fibers having orientations more perpendicular to the thermal gradient are more efficient in blocking radiation heat transfer. However, such fiber orientations result in products which do not have the desired loft. The optical constants of the glass, which are dependent on its chemical composition, also influence the blocking of radiation heat transfer. Glasses with higher optical constants, i.e., higher refractive and absorptive indexes in the infrared range corresponding to room temperature radiation, will scatter and/or absorb heat radiation more effectively than glasses with lower refractive and absorptive indexes in this range.

Room temperature radiation heat emission has a spectrum in which the radiated energy is predominately in the wavelength range of 2.5 $\mu$m to 60 $\mu$m. The range of importance with respect to insulation products is somewhat narrower, i.e., from about 4 $\mu$m to about 40 $\mu$m, within which the radiation energy density is higher than about 5 percent of the peak emission which occurs at about 9.7 $\mu$m. Therefore, to improve insulation efficiency, the glass composition must have higher optical constants in the 4–40 $\mu$m infrared range. However, it must be emphasized that merely increasing the optical constants is not a satisfactory solution. To be commercially feasible, the glass must also retain the ability to be readily fiberized via current fiberizing processes.

If glass compositions could be identified which retain their ability to be readily fiberized into uniformly distributed thin fibers while at the same time having high absorptive and scattering efficiency in the room temperature infrared range, such glass compositions could accrue enormous benefits to both the manufacturer and consumer of insulation products. The advantages obtained by superior absorption and/or scattering capabilities in the infrared 4–40 $\mu$m range assume that the glass compositions can be produced at a reasonable batch cost, otherwise the economic benefits offered by increased thermal efficiency will be offset by higher raw material cost. The higher thermal efficiency will allow the manufacturer to reduce product density to achieve comparable insulation efficiency leading directly to cost reduction at present production volume. Higher production volume from current facilities may be achieved due to the improvement in productivity which results from lower product density. Alternatively, at the same production volume, a product with higher thermal efficiency may be produced without increasing the nominal thickness or density of the insulation.

It is absolutely necessary that the glass composition, in addition to exhibiting higher optical constants in the 4 to 40 $\mu$m infrared range, must also be capable of economical production of uniformly distributed thin fibers. In order to do so, the rotary fiberization process is generally employed. In this process, a stream of molten glass is supplied to a rapidly spinning disk, around the periphery of which are located a plurality of fiberization orifices. As the disk rapidly spins, glass fiber strands, generally having diameters from 30 $\mu$m to 200 $\mu$m, are rapidly thrown from the spinner. Upon their exit from the spinner, the strands are met by a downwardly descending high velocity jet of hot gas or air which rapidly attenuates the fibers into the very fine diameter fibers necessary to produce thermal insulation products. The attenuated fibers pass through a forming tube and from these onto a moving foraminous conveyor belt. Prior to and/or after collection on the conveyor belt, the fiberglass media is generally sprayed with one or more binder resin solutions which assist in consolidating the insulation as well as providing a mechanism for thickness recovery after compression during shipment and storage.

In the rotary fiberization process, it is important that the HTV (high temperature viscosity), be of a temperature suitable for use in the rotary process without excessive corrosion or erosion of the spinner by the molten glass. The HTV is generally defmed as the temperature at which the glass viscosity reaches $10^3$ poise. Fiberization generally occurs close to the HTV. In the preferred rotary process, the HTV is desired to be from about 1720° F. to about 1840° F. (940° C. to 1000° C.). Some rotary processes are capable of using somewhat higher HTVs. Furthermore, to avoid crystallization of the glass in the furnace, forehearth, or disk, it is necessary that the liquidus temperature, the temperature at which crystallization of the glass may occur, is at least 80° F. below the HTV, and preferably lower.

Infrared absorbing glass has been manufactured by doping transition metal oxides into the glass to increase infrared absorption. However, this method, for example the use of iron oxides as the dopant, is only suitable in the near infrared range (1–4 $\mu$m). For the 4–40 $\mu$m infrared range, i.e., that corresponding to room temperature radiation where insulation must be highly effective, transition metal doping has been found not to be useful. It is also possible to increase the optical constants of a glass in the 4–40 $\mu$m infrared range by altering the vibration modes of the glass network. To further increase the optical constant of a silicate based glass in the 4–40 $\mu$m infrared range, for example, one method is to increase the net concentration of glass network formers. However, increasing the content of typical glass network formers such as silicon dioxide, the basic constituent of silicate glasses, or aluminum oxide, is generally accompanied by significant increase in glass viscosity, which will render the glass unsuitable for melting and fiberizing by current processes. Addition of phosphate ($P_2O_5$) to a silicate glass will usually result in phase separation and devitrification, especially when there are appreciable amounts of calcium oxide present, as is the case with most commercial glass compositions.

In the article "Influence Of The Chemical Composition Of Glass On Heat Transfer Of Glass Fiber Insulations In Relation To Their Morphology And Temperature Of Use", C. Langlais et al., FUNDAMENTAL GLASS MANUF. PROCESS 1991, increasing the boron content of glasses was shown to produce an increase in the capability of the glass to absorb and/or scatter infrared radiation heat in the infrared range. However, the increase in absorption and/or scattering capability was limited to relatively low boron contents; no further increase was exhibited by boron contents higher than 7%. Furthermore, the glasses described had high HTV's, and thus are not suitable for use in the preferred rotary fiberization processes.

While low batch cost, ease of fiberization, and high thermal efficiency is desired of fiberglass insulation products, high biosolubility is also desired. For example, during the handling operations associated with the installation of fiberglass insulation products, inhalation or ingestion of glass fibers may occur. Because biological transport mechanisms are generally inefficient in removing such fibers from the body, it is necessary that these fibers be rapidly dissolved by biological fluids. The relative solubility of fiberglass insulation fibers can be assessed by measuring the biodissolution rate in simulated extracellular fluid. It is desirable that such fibers have a biodissolution rate, measured as hereinafter described, of at least 300 ng/cm$^2$ hr. While high biodissolution rates are desired, at the same time high moisture resistance is required as well. As the glass fibers are generally used in environments with appreciable amounts of humidity, adsorption of water vapor from the air or other environment may decrease the strength of the fibers, resulting in easy breakage when stressed. As can be imagined, high biodissolution rates and high moisture resistance are, in general, conflicting goals.

In Mattson, U.S. Pat. No. 5,523,264, there are disclosed glass compositions and fibers made therefrom having increased levels of $Na_2O$, with high levels of $B_2O_3$. The glasses contain, however, only small amounts of alumina, generally less than 3 wt. %, and more preferably in the range of from 1–2 wt. %. The glass fibers are alleged to exhibit excellent biodegradability characteristics.

In Cohen, U.S. Pat. No. 5,108,957, glass compositions are disclosed which are useful for forming fibers which are biodegradable. The preferred range of boron is from 4–11 wt. % $B_2O_3$ in the glass composition.

An important factor in the economic viability of insulation is the stiffness and recovery of the fiberglass bats after compressed packaging. One of the major advantages of fiberglass insulation is that it can be compressed into small packages to save transportation costs and then recovered to the design thickness on the construction site after the packages are opened. The recovery of the fiberglass insulation products is dependent upon a number of variables, such as the density, fiber quality, binder distribution, and glass-binder interaction. It is therefore important not to overlook the recovery aspects of the fiberglass product, for otherwise the industry may not find a produce practical even if it exhibits excellent technical characteristics.

It would therefore be desirable to provide glass compositions which are suitable for rotary fiberization utilizing current equipment, yet which produce glass fibers with enhanced optical constants in the 4 to 40 $\mu$m infrared range so as to increase the room temperature total radiation extinction efficiency. It would further be desirable to provide such glass compositions at batch costs which do not result in incurring a substantial economic penalty. It would yet further be desirable to produce such glass compositions which display not only acceptable or superior moisture resistance, but which display excellent biodissolution rates as well, and can meet the practical requirements of excellent stiffness and recovery characteristics.

SUMMARY OF THE INVENTION

It has now been surprisingly discovered that glass compositions having excellent infrared absorption and scattering efficiency in the 4–40 $\mu$m infrared range may be produced from soda-lime borosilicate glasses having high boron oxide content and a low concentration of alkaline earth metal oxides. These glasses have HTV's suitable for rotary fiberization, preferably in the range of 1720° F. to 1840° F. (940° C. to 1000° C.), and have liquidus temperatures which are sufficiently below the HTV to allow for fiber insulation products to be manufactured via the rotary process. The glass fiber insulation products prepared from these glasses exhibit very low thermal conductivities, as indicated by comparing the thermal insulation efficiencies of insulation products produced from the subject glasses with otherwise similar products prepared from other glasses. In addition, these glasses display not only high moisture resistance, but also display excellent biosolubility as measured by the biodissolution rate in simulated extracellular fluid.

It has also been surprisingly found that the recovery properties of fiberglass products made from the glass compositions containing less than 18 wt. % $B_2O_3$ have improved recovery and stiffness, so as to be acceptable to customers from a practical standpoint. Therefore, the glass compositions of the present invention contain from 12–16 wt. % $B_2O_3$. The compositions also contain from 3–6 wt. %, more preferably 4–6 wt. %, $Al_2O_3$ for chemical stability.

DESCRIPTION OF THE PREFERRED EMBODIMENTS

Figure 1:
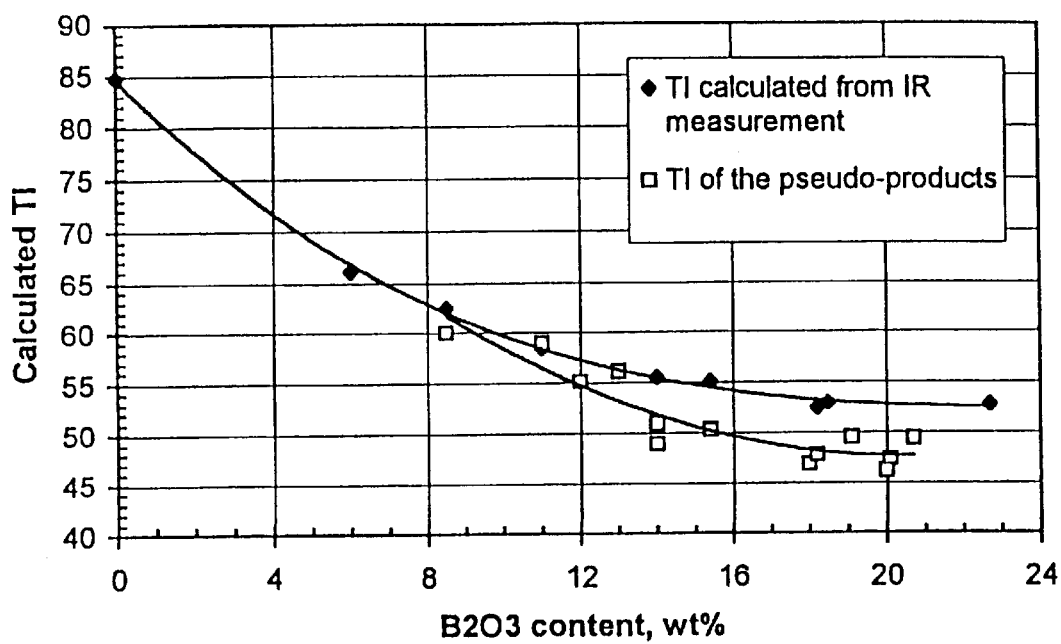
FIG. 1 of the Drawing graphically depicts the thermal index (TI) for fiberglass having different $B_2O_3$ contents.
Figure 2:
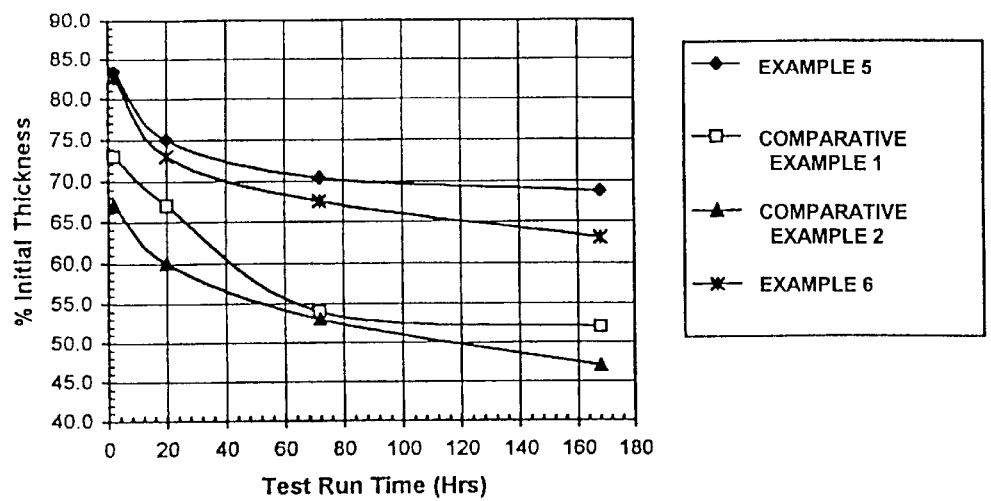
In FIG. 2 of the Drawing, there is graphically depicted the results of a compressed aging test (XZ-23 test).

The glass compositions of the present invention are suitable for use in the rotary fiberization process and are capable of producing very fine and uniformly distributed fibers such as those suitable for fiberglass insulation products. Suitable glasses preferably have an HTV ($10^3$ poise) in the range of about 1720° F. to 1840° F. (940° C. to 1000° C.). The liquidus temperatures are lower than the HTV by 80° F., and preferably lower by 150° F. or more.

The glass compositions of the subject invention can be characterized by containing, in weight percent relative to the total weight of all components, from 50–60% $SiO_2$, 3–6% $Al_2O_3$, 2–10% CaO, 1–8% MgO, 12–16% $B_2O_3$, 10–18% $Na_2O$, and 0–3% $K_2O$. In addition to these basic ingredients, the glasses may optionally contain from 0–4% $TiO_2$, 0–4% $ZrO_2$, 0–3% BaO, 0–4% ZnO, and 0–2% $F_2$. Quantities of phosphates below a level that which would result in phase separation and/or devitrification are suitable. Further optional ingredients include transition metal oxides, especially $Fe_2O_3$, which can be added, when desired, to increase the absorption and refractive characteristics of the glass in the near (1–4 μm) infrared range. However, near infrared absorption and refractive characteristics are not necessary for commercial building insulation.

The optional ingredients and any additional ingredients not herein listed, may only be added in amounts which do not materially alter the desired glass characteristics. In this respect, the desired characteristics are the HTV range; a liquidus temperature which is below the HTV temperature by the disclosed amounts, a room temperature radiation heat extinction coefficient greater than 0.1139, and more preferably greater than 0.1150 and a biodissolution rate in simulated extracellular fluid greater than 300 ng/cm². hr. and more preferably greater than 500 ng/cm².hr. Most preferably, the basic glass ingredients are limited to $SiO_2$, $B_2O_3$, $Al_2O_3$, CaO, MgO, $Na_2O$, $K_2O$, and $F_2$. The general, preferred, and most preferred ranges are set forth below in Table 1.

TABLE 1

| | Weight Percentage Composition[1] | | |
|---|---|---|---|
| Ingredient | General | Preferred | Most Preferred |
| $SiO_2$ | 50–60 | 54–60 | 56–58 |
| $Al_2O_3$ | 3–6 | 4–6 | 4.5–5.5 |
| $B_2O_3$ | 12–16 | 13–15 | 14 |
| CaO | 2–10 | 3–7 | 4–6 |
| MgO | 1–8 | 2–5 | 2–5 |
| $Na_2O$ | 10–18 | 12–17 | 14–17 |
| $K_2O$ | 0–3 | 0–2 | 0–2 |
| $Li_2O$[2] | 0–2 | 0–1 | 0–1 |
| $TiO_2$ | 0–4 | 0–2 | 0–1 |
| $ZrO_2$ | 0–4 | 0–2 | 0–1 |
| BaO[2] | 0–3 | 0–2 | 0–1 |
| ZnO | 0–4 | 0–4 | 0–1 |
| $F_2$ | 0–2 | 0–2 | 0–1 |
| $P_2O_5$ | <1 | <1 | <1 |
| $Fe_2O_3$[3] | 0–5 | 0–2 | 0–0.5 |
| $M_xO_y$[4] | 0–5 | 0–2 | 0–0.5 |

[1]Sum of all weight percentages will not exceed 100% in the actual glass.
[2]$Li_2O$ and BaO are generally not preferred (absent) when present, their weight percentages, when added to the weight percentages of other similar oxides should not exceed the totals for those other oxides.
[3]$Fe_2O_3$ represents other iron oxides as well, e. g., FeO, $Fe_3O_4$, etc.
[4]$M_xO_y$ represents a transition metal or inner transition metal oxide other than iron oxide.

U.S. Pat. No. 5,536,550 describes the manufacture of bicomponent curly glass fibers by cofiberization of two distinct glasses having coefficients of thermal expansion (CTE) which are sufficiently different that upon cooling, the internal stress created by the differences in the CTEs of the glasses cause the attenuated fibers to curl. To generate the different CTEs, different glass chemistries are used.

In the present invention, single glass fibers may be prepared by the rotary process which have high insulation efficiency due to the higher total heat extinction efficiencies which may be obtained without the necessity of providing two different glasses with different CTEs. The glasses suitable for preparation or single glass fibrous insulation products correspond to those having the general composition, in weight percent, of 50–60% $SiO_2$, greater than 3%, i.e., 3–6% $Al_2O_3$; 12–16% $B_2O_3$; 10–18% $Na_2O$; 0–3% $K_2O$; 2–10% CaO; and 1–8% MgO. Additional ingredients can be added in minor amounts such as described for the glass compositions disclosed previously. By the term "single glass" is meant that a single glass is fed to the spinner of the rotary fiberizer.

Having generally described this invention, a further understanding can be obtained by reference to certain specific examples which are provided herein for purposes of illustration only and are not intended to be limiting unless otherwise specified. In the actual experimental examples which follow, physical and physicochemical parameters were measured by conventional methods except where indicated.

The procedure used to evaluate biodissolution rate is similar to that described in Law et al. (1990). The procedure consists essentially of leaching a 0.5 gram aliquot of the candidate fibers in a synthetic physiological fluid, known as Gamble's fluid, or synthetic extracellular fluid (SEF) (simulated physiological fluid) at a temperature of 37° C. and a rate adjusted to achieve a ratio of flow rate to fiber surface area of 0.02 cm/hr to 0.04 cm/hr for a period of up to 1,000 hours duration. Fibers are held in a thin layer between 0.2 μm polycarbonate filter media backed by plastic support mesh and the entire assembly placed within a polycarbonate sample cell through which the fluid may be percolated. Fluid pH is regulated to 7.4+0.1 through the use of positive pressure of 5% $CO_2$/95% $N_2$ throughout the flow system.

Elemental analysis using inductively coupled plasma spectroscopy (ICP) of fluid samples taken at specific time intervals are used to calculate the total mass of glass dissolved. From this data, an overall rate constant could be calculated for each fiber type from the relation:

$$k_{dis} = [d_o \rho (10 M/M_o)^{0.5}])/2t$$

where $k_{dis}$ is the dissolution rate constant in SEF, $d_o$ the initial fiber diameter, $\rho$ the initial density of the glass comprising the fiber, $M_o$ the initial mass of the fibers, M the final mass of the fibers ($M/M_o$=the mass fraction remaining), and t the time over which the data was taken. Details of the derivation of this relation is given in Leineweber (1982) and Potter and Mattson (1991). Values for $k_{dis}$ may be reported in ng/cm². hr and preferably exceed a value of 50. Replicate runs on several fibers in a given sample set show that k values are consistent to within 3 percent for a given composition. Data obtained from this evaluation can be effectively correlated within the sample set chosen dissolution data used to derive $k_{dis}$'s were obtained only from experimental samples of uniform (3.0 μm) diameter and under identical conditions of initial sample surface area per volume of fluid per unit time, and sample permeability. Data was obtained from runs of up to 30 days to obtain an accurate representation of the long term dissolution of the fibers.

The room temperature radiation heat extinction efficiency may be calculated using Mie scattering theory equations based on the measured optical constants of bulk glass in the 2.5 to 25 μm infrared range. The Mie equations calculate the extinction efficiency of fibers based on their diameters, the radiation heat wavelength, and the optical properties of the glass used in making the fibers, substantially as set forth in C. Langlais et al., FUNDAMENTAL GLASS MANUF. PROCESS, 1991, pp. 3–11 (1991) herein incorporated by reference. For the optical constant measurement, a test piece of bulk glass is cut into a rectangular shape approximately 25 mm×25 mm ×5 mm in size, with one large side polished. Specular reflectance in the 2.5 to 25 μm infrared range is measured at several different reflection angles and polarizations using a standard FTIR instrument. The optical constants (n+ik, where n and k are the refractive and absorptive indices, respectfully) are derived from the measured reflectance using the Fresnel reflection equations.

The following describes the method of calculation of a "total extinction efficiency" used to compare expected thermal performance of fibrous glass. The extinction efficiency (Q) of a given diameter glass fiber can be calculated at a given radiation wavelength if the optical properties (refractive index and absorptive index, or the complex refractive index m=n+ik) are known at that wavelength. Using the Mie scattering equations, this efficiency is the ratio of the extinction "cross-section" to the geometric cross-section of the fiber. To simplify the otherwise rather complex mathematics only normal incident radiation is considered and a nonpolarized average of the incident electric field vector both perpendicular and parallel to the fiber plane is used to calculate Q. The Mie equations for fibers can be found in many texts such as THE SCATTERING OF LIGHT AND OTHER ELECTROMAGNETIC RADIATION by Kerker (1969) in chapter 6, or in ABSORPTION AND SCATTERING OF LIGHT BY SMALL PARTICLES by Bohren and Huffman (1983) in chapter 8.

Fibrous insulations are usually designed around their performance at "room temperature" (24° C.). At any temperature there are a distribution of radiation wavelengths involved in heat transfer. These wavelengths are given by the Planck distribution, or "black-body" curve. Therefore, the efficiency, Q, must be integrated over the wavelengths of the Planck distribution at the mean temperature of the insulation.

$$\int_{\lambda\,min}^{\lambda\,max} Q(d, \lambda, m) W_\lambda \delta\lambda$$

In this integral $W_\lambda$ is the Planck emissive power as a function of radiation wavelength. In addition, there are many different size fibers in an insulation and each interacts with radiation in its own way. Therefore, the integration must be over the diameters of this distribution, N(d) In the model, the fiber diameter distribution is assumed to be a normal distribution of fibers of 3.00 μm mean diameter and a FWHM (Full Width at the Half Maximum)=0.50 μm.

$$\int_{d\,min}^{d\,max} \int_{\lambda\,min}^{\lambda\,max} Q(d, \lambda, m) N(d) \delta\lambda \, \delta d$$

In using these equations to compare various glasses, it is important to do some normalization. First, the Planck distribution emissive power should be normalized by dividing it by the maximum emissive power at that temperature. Also, since it is desired to maximize the performance of the fiber for each pound of glass used, the expression should be normalized per volume of glass. This then results in the following expression for a "total extinction efficiency".

$$Q_{TOT} = \frac{\int\int N(d) Q(d, \lambda, m) \frac{W_\lambda}{W_{max}} \delta\lambda \, \delta d}{\int N(d) \frac{\pi d^2}{4} \delta d}$$

The total radiation heat extinction efficiency may be measured by other techniques as well, and normalized to the values given herein by the ratio of the measured value of the glass of Comparative Example C1 to the value measured for this glass by the above technique, 0.1139.

The thermal efficiency of an insulation product may be measured by numerous techniques. In general, comparative measurements are necessary to relate the thermal efficiency of an insulation product prepared from one glass to the thermal efficiency of an insulation product prepared from a second glass. To adequately assess improvements due to glass composition and the accompanying change in absorptive and refractive indexes in the 4–40 μm infrared range, for example, the thermal conductivities of two otherwise similar fiberglass insulation products having the same density, fiber size, etc., may be compared. The inventive glasses have superior thermal efficiencies as compared to standard insulation products.

The effect of moisture on the fibers of fiberglass insulation products may be measured by numerous techniques. For example, R. J. Charles, J. APPL. PHY., 29, 1657 (1958), herein incorporated by reference, has shown that if one assumes slow crack growth under stress is the main mechanism of failure for fiber products in a moist environment, the so-called "fatigue resistance parameter", N, may be used as an indicator to evaluate moisture resistance of glass fibers. The effect of time on the strength of glass fibers maintained in a moist environment is determined by measuring breaking strength at different loading rates. The data is observed to fit the equation:

$$\log(s) = K + \frac{1}{N+1}(\log(b))$$

where s is the mean strength, b is the loading rate, K is a constant, and N is the fatigue resistance parameter. High values of N correspond to good resistance to delayed fracture of glass fibers when exposed to stress-humidity-temperature. Moisture resistance may be measured by other techniques as well.

The glass compositions of the present invention are suitable for rotary fiberization utilizing current equipment, yet produce glass fibers with enhanced optical constants in the 4 to 40 μm infrared range so as to increase the room temperature total radiation extinction efficiency. The glass compositions of the present invention therefore permit forming fibers with low batch cost, ease of fiberization, and high thermal efficiency. The glass compositions also provide fibers which exhibit a high biosolubility, as well as superior moisture resistance. Both of these latter characteristics are extremely important to the commercial viability and practicality of the product. The specific glass compositions of the present invention, however, also provide good stiffness and recovery. The recovery and stiffness characteristics of the fibers made permit products which are acceptable to customers, thereby lending practical handling and performance of the products acceptable.

As discussed earlier, one of the major advantages of fiberglass insulation is that it can be compressed into small packages to save transportation costs and then recovered to the designed thickness on the construction site after the packages are opened. The specific glass compositions of the present invention provide good stiffness and recovery in fibers made therefrom, while also permitting one to realize and enjoy the benefits of high thermal efficiency as reflected in a desirable TI. Thermal index (TI) is a method for assessing comparative performance in thermal insulation efficiency. A reduction in TI can translate directly into a reduction in product density while achieving the same thermal insulation performance. This benefit is achieved by utilizing from about 12 to about 16 wt % $B_2O_3$ in the glass composition. This amount of $B_2O_3$ has been found to be particularly important from a practical standpoint for purposes of recovery and hence economics. The benefits of limiting the amount of $B_2O_3$ to achieve unexpected results with regard to recovery as well as economic viability is demonstrated in FIG. 1 of the Drawing. FIG. 1 graphically depicts the thermal index for fiberglass with different $B_2O_3$ contents. The graph shows that to obtain a significant TI reduction (e.g., from 7 to 8 points) as compared to compositions containing small amounts of $B_2O_3$ (e.g., about 8 wt %) while avoiding the drop off in recovery once one approaches 18 wt % $B_2O_3$, the amount of $B_2O_3$ in the glass composition should be in the range of from about 12 to 16 wt %, with about 14 wt % $B_2O_3$ being most preferred. Once one exceeds the range of about 12 to 16 wt %, the return is diminishing with regard to reduction in TI, while the amount of loss and recovery accelerates to the point that it becomes unacceptable commercially. Thus, it is believed that the glass compositions of the present invention provide one with the ability to economically prepare glass fibers and products therefrom which exhibit commercially desirable characteristics of TI, density, biosolubility, moisture resistance and recovery.

EXAMPLE 1–4

Examples 1–4 are representative of glass compositions suitable for use in the subject invention. Glasses were prepared by conventional glass preparation and refining techniques. The HTV ($10^3$ poise) and liquidus temperatures were measured by standard methods. The composition are presented in Table 2 below. All the glasses were found to have HTVs in the range of 1720° F. to 1840° F. with liquidus temperatures well below the respective HTVS. In each case, the liquidus was at least 100° F. lower than the respective HTV. All the glasses are suitable for fiberization by the rotary process.

TABLE 2

| Ingredient | Example 1 | Example 2 | Example 3 | Example 4 |
|---|---|---|---|---|
| $SiO_2$ | 58.00 | 54.00 | 57.00 | 53.60 |
| $B_2O_3$ | 14.00 | 14.00 | 12.00 | 16.20 |
| $Al_2O_3$ | 3.70 | 6.00 | 4.50 | 4.86 |
| CaO | 5.00 | 6.00 | 5.30 | 6.00 |
| MgO | 3.50 | 4.50 | 3.70 | 4.00 |
| $Na_2O$ | 15.00 | 14.50 | 16.50 | 14.00 |
| $K_2O$ | 1.00 | 1.00 | 1.00 | 1.03 |
| $F_2$ | | | | 0.51 |
| HTV, ° F. | 1820 | 1810 | 1800 | 1761 |
| Liquidus Temperature, ° F. | 1550 | 1700 | 1575 | 1653 |

EXAMPLE 5, 6 and Comparative Examples C1 and C2

Two experimental glasses corresponding to the subject invention were prepared and compared to two glasses containing 18 wt % $B_2O_3$. The composition, HTV, liquidus, total radiation heat extinction efficiency, thermal index (T.I.), biodissolution rate, and fatigue resistance parameter are indicated below in Table 3.

TABLE 3

| Ingredient | Comparative Example C1 | Example 5 | Example 6 | Comparative Example C2 |
|---|---|---|---|---|
| $SiO_2$ | 55.2 | 58.1 | 57.1 | 54.7 |
| $Al_2O_3$ | 4.82 | 4.06 | 5.1 | 4.8 |
| $B_2O_3$ | 18 | 14 | 14 | 18 |
| CaO | 5.35 | 5.11 | 5.1 | 4.8 |
| MgO | 3.93 | 3.11 | 2.4 | 2.2 |
| $Na_2O$ | 11.7 | 14.7 | 15.2 | 10.3 |
| $K_2O$ | 1 | 0.91 | 1.1 | |
| HTV (measured) | 1829° F. | 1821° F. | 1818° F. | 1838° F. |
| Liquidus Temperature (measured) | 1710° F. | 1555° F. | 1539° F. | 1691° F. |
| Room Temperature Radiation Heat Extinction Coefficient | 0.1186 | 0.1180 | 0.1178 | 0.1184 |
| T.I. for unbounded fiber product sample (produced in pilot facility with constant process parameters | 46.8 | 50.9 | 51.0 | 47.8 |
| Biosolubility ($K_{dis}$, ng/cm$_2$ hr) | 1300 | 810 | 780 | 1275 |
| Fatigue Resistance Parameter | 24.7 ± 2.0 | 21.8 ± 2.0 | 20 ± 2.0 | 22.5 ± 2.0 |

The moisture resistance of the glass fibers was determined by the recovery of the product after compressed aging (xz-23 test). During the test, the samples of the product are compressed 4:1 in the thickness direction, and then aged in a hot and humid environment, 155° F. and 95% relative humidity. The test results for these glasses, the 18 wt. % $B_2O_3$ formulas and Examples 5 and 6, are shown in the Figures of the Drawing. It is clear that the recovery curve of the fiber samples made from glass fiber of the present invention (Examples 5 and 6) demonstrated significantly better recovery than for fiber samples containing 18 wt. % $B_2O_3$.

It is thus decided that glasses of the present invention can be economically made into fiberglass insulations with higher thermal insulation efficiency, adequate recovery after long term compressed packaging, and sufficiently high biosolubility. The major application of these glass compositions will be to produce building insulations with lower product density so as to increase production line capacity and reduce production cost.

Having now fully described the invention, it will be apparent to one of ordinary skill in the art that many changes and modifications can be made thereto without departing from the spirit or scope of the invention as set forth herein.

What is claimed is:

1. A glass composition exhibiting high radiation heat transfer resistance in the 4–40 μm infrared range, said composition comprising, in weight percent relative to the total composition weight:

50–60% $SiO_2$

4–6% $Al_2O_3$

13–16% $B_2O_3$

2–10% CaO

1–8% MgO

10–18% $Na_2O$

0–3 % $K_2O$

0–2% $F_2$ said glass composition having an HTV ($10^3$ poise) suitable for rotary fiberization, a liquidus which is lower than the HTV by at least 80° F., and a total radiation heat extinction efficiency greater than 0.1139 in the wavelength range of 4–40 μm.

2. The glass composition of claim 1 wherein the weight percent of $SiO_2$ is from about 54% to 60%, the weight percent of CaO is from about 3% –7%, the weight percent of MgO is from about 2% to 5%.

3. The composition of claim 1 wherein the HTV is in the range of about 1720° F. to about 1840° F.

4. The composition of claim 1 wherein the liquidus temperature is less than the HTV by greater than 150° F.

5. The composition of claim 1 wherein the total radiation heat extinction efficiency is greater than 0.1150.

6. The composition of claim 1 wherein the biodissolution rate in simulated extracellular fluid is greater than 300 ng/cm² hr.

7. The composition of claim 1 wherein the biodissolution rate in simulated extracellular fluid is greater than 500 ng/cm² hr.

8. In a process for the preparation of fiberglass thermal insulation by the rotary process the improvement comprising employing the glass composition of claim 1.

9. In a process for the preparation of fiberglass thermal insulation by the rotary process the improvement comprising employing the glass composition of claim 2.

10. In a process for the preparation of fiberglass thermal insulation by the rotary process the improvement comprising employing the glass composition of claim 3.

11. In a process for the preparation of fiberglass thermal insulation by the rotary process the improvement comprising employing the glass composition of claim 4.

12. In a process for the preparation of fiberglass thermal insulation by the rotary process the improvement comprising employing the glass composition of claim 5.

13. In a process for the preparation of fiberglass thermal insulation by the rotary process the improvement comprising employing the glass composition of claim 6.

14. In a process for the preparation of fiberglass thermal insulation by the rotary process the improvement comprising employing the glass composition of claim 7.

15. A glass fiber insulation product exhibiting a high thermal insulation efficiency, said insulation comprising glass fibers formed from the glass composition of claim 1.

16. A glass fiber insulation product exhibiting a high thermal insulation efficiency, said insulation comprising glass fibers formed from the glass composition of claim 2.

17. A glass fiber insulation product exhibiting a high thermal insulation efficiency, said insulation comprising glass fibers formed from the glass composition of claim 3.

18. A glass fiber insulation product exhibiting a high thermal insulation efficiency, said insulation comprising glass fibers formed from the glass composition of claim 4.

19. A glass fiber insulation product exhibiting a high thermal insulation efficiency, said insulation comprising glass fibers formed from the glass composition of claim 5.

20. A glass fiber insulation product exhibiting a high thermal insulation efficiency, said insulation comprising glass fibers formed from the glass composition of claim 6.

21. A glass fiber insulation product exhibiting a high thermal insulation efficiency, said insulation comprising glass fibers formed from the glass composition of claim 7.

22. In a process for the preparation of single glass fiberglass insulation products wherein a single glass melt is fiberized by the rotary fiberizing process, the improvement comprising selecting as said single glass a glass having a high total radiation extinction efficiency, said single glass having a composition comprising, in weight percent relative to the total weight of the glass:

50–60% $SiO_2$

4–6% $Al_2O_3$

13–15% $B_2O_3$

10–18% $Na_2O$

0–3% $K_2O$

2–10% CaO

1–8% MgO, said single glass having an HTV ($10^3$ poise) suitable for rotary fiberization, and a liquidus which is lower than the HTV by minimally about 80° F.

23. The process of claim 22 wherein said single glass has a total heat extinction efficiency greater than 0.1139.

24. The process of claim 22 wherein said liquidus is lower than said HTV by about 150° F. or more.

25. A single glass fiberglass insulation product exhibiting a high total heat extinction efficiency, said product comprising glass fibers produced by the rotary fiberization process employing a single glass, said single glass comprising, in weight percent relative to the total weight of the glass:

54–60% $SiO_2$

4–6% $Al_2O_3$

13–15% $B_2O_3$

10–18% $Na_2O$

0–3% $K_2O$

2–10% CaO

1–8% MgO, said single glass having a liquidus which is lower than the HTV ($10^3$ poise) of the single glass by about 80° F. or more.

26. The insulation product of claim 25 wherein the total heat extinction efficiency is greater than 0. 1139.

27. The insulation product of claim 25 wherein the liquidus of said single glass is lower than the HTV by about 150° F. or more.

* * * * *